(12) United States Patent
Pan et al.

(10) Patent No.: US 11,285,970 B2
(45) Date of Patent: Mar. 29, 2022

(54) VEHICLE TRACK PREDICTION METHOD AND DEVICE, STORAGE MEDIUM AND TERMINAL DEVICE

(71) Applicant: Baidu Online Network Technology (Beijing) Co., Ltd., Beijing (CN)

(72) Inventors: Yifeng Pan, Beijing (CN); Xuguang Yang, Beijing (CN); Feiyi Jiang, Beijing (CN); Zhongtao Chen, Beijing (CN); Yixian Li, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 69 days.

(21) Appl. No.: 16/794,491

(22) Filed: Feb. 19, 2020

(65) Prior Publication Data

US 2020/0290651 A1    Sep. 17, 2020

(30) Foreign Application Priority Data

Mar. 12, 2019   (CN) ........................ 201910185821.X

(51) Int. Cl.
*B60W 60/00*   (2020.01)
*G05D 1/02*   (2020.01)

(52) U.S. Cl.
CPC ... *B60W 60/00272* (2020.02); *B60W 2552/05* (2020.02); *B60W 2552/53* (2020.02);
(Continued)

(58) Field of Classification Search
CPC ......... B60W 30/0953; B60W 30/0956; B60W 60/00272; B60W 2552/05;
(Continued)

(56) References Cited

U.S. PATENT DOCUMENTS 9,495,874 B1   11/2016   Zhu et al.
9,669,827 B1   6/2017   Ferguson et al.
(Continued)

FOREIGN PATENT DOCUMENTS

CN   104867329 A   8/2015
CN   104882025 A   9/2015
(Continued)

OTHER PUBLICATIONS

First Office Action from The State Intellectual Property Office of People's Republic of China in Chinese Application No. 201910185821. X, dated Feb. 28, 2020 (13 pages).
(Continued)

*Primary Examiner* — Anshul Sood
(74) *Attorney, Agent, or Firm* — Benesch, Friedlander, Coplan & Aronoff LLP

(57) ABSTRACT

A vehicle track prediction method and device, a storage medium and a terminal device are provided. The method includes: determining an obstacle vehicle entering a junction region in a case that an autonomous vehicle enters the junction region; acquiring historical traveling data of the obstacle vehicle in the junction region; predicting a potential track of the obstacle vehicle according to the historical traveling data and a current traveling state of the obstacle vehicle; and predicting a track of the autonomous vehicle in the junction region according to the potential track of the obstacle vehicle and a current traveling state of the autonomous vehicle. A decision making accuracy in self-driving may be effectively improved, and a driving risk may be reduced.

15 Claims, 4 Drawing Sheets

(52) U.S. Cl.
 CPC ... *B60W 2554/404* (2020.02); *B60W 2556/10* (2020.02); *G05D 1/0212* (2013.01); *G05D 2201/0213* (2013.01)

(58) Field of Classification Search
 CPC ....... B60W 2552/53; B60W 2554/404; B60W 2556/10; G05D 1/0212; G05D 2201/0213
 See application file for complete search history.

(56) References Cited

U.S. PATENT DOCUMENTS

| | | | |
|---|---|---|---|
| 9,845,164 | B2 | 12/2017 | Ahmed et al. |
| 2014/0088855 | A1* | 3/2014 | Ferguson ............... G08G 1/166 701/117 |
| 2014/0142799 | A1 | 5/2014 | Ferguson et al. |
| 2018/0148052 | A1* | 5/2018 | Suto ............... B60W 30/18145 |
| 2018/0239361 | A1 | 8/2018 | Micks et al. |
| 2018/0365999 | A1 | 12/2018 | Wiklinska et al. |
| 2020/0255027 | A1* | 8/2020 | Kulkarni .............. G05D 1/0257 |

FOREIGN PATENT DOCUMENTS

| | | |
|---|---|---|
| CN | 106652515 A | 5/2017 |
| CN | 107340772 A | 11/2017 |
| CN | 109969177 A | 7/2018 |
| CN | 108364461 A | 8/2018 |
| JP | 2005165555 A | 6/2005 |
| JP | 2006-284254 A | 10/2006 |
| JP | 2014-203168 A | 10/2014 |
| JP | 2016075905 A | 5/2016 |
| JP | 2016207016 A | 12/2016 |
| JP | 2017027599 A | 2/2017 |
| JP | 2018511505 A | 4/2018 |
| JP | 2019-032708 A | 2/2019 |
| WO | 2018123014 A1 | 7/2018 |

OTHER PUBLICATIONS

Search Report issued by The State Intellectual Property Office of People's Republic of China in Chinese Application No. 201910185821X, dated Feb. 20, 2020 (5 pages).
Extended European Search Report in European Patent Application No. 20159420.7, dated Aug. 4, 2020 (10 pages).
Third Office Action from The State Intellectual Property Office of People's Republic of China in Chinese Patent Application No. 201910185821X, dated Oct. 22, 2020 (6 pages).
Supplementary Search Report issued by The State Intellectual Property Office of People's Republic of China in Chinese Patent Application No. 201910185821X, dated Oct. 14, 2020 (4 pages).
Notice of Reasons for Refusal from Korean Intellectual Property Office in Korean Patent Application No. 10-2020-0020606, dated Feb. 25, 2021 (11 pages).
Notice of Reasons for Refusal from Japanese Patent Office in Japanese Patent Application No. 2020-029954, dated Feb. 18, 2021 (9 pages).
Chen, Lei, et al., "Cooperative Intersection Management: A Survery", A Survey, IEEE Transactions on Intelligent Transportation Systems, vol. 17, No. 2, 2016, pp. 570-586.
Ding, Hongwei, et la., "Vehicle Intersection Collision Monitoring Algorithm Based on VANETs and Uncertain Trajectories", 16th International Conference on Intelligent Transportation Systems Telecommunications, 2018, pp. 1-7.
Zeng, Ruili, et al., "Collision Probability Computation Based on Vehicle to Vehicle Communication", IEEE International Conference on Cyber Technology in Automation, Control, and Intelligent Systems, 2015, paged 1462-1467.
Notice of Reasons for Refusal issued by the Japanese Patent Office in Japanese Application No. 2020-029954, dated Jan. 25, 2022 (8 pages).

* cited by examiner

VEHICLE TRACK PREDICTION METHOD AND DEVICE, STORAGE MEDIUM AND TERMINAL DEVICE

CROSS-REFERENCE TO RELATED APPLICATION

This application claims priority to Chinese Patent Application No. 201910185821.X, entitled "Vehicle Track Prediction Method and Device, Storage Medium and Terminal Device", and filed on Mar. 12, 2019, which is hereby incorporated by reference in its entirety.

TECHNICAL FIELD

The disclosure relates to the technical field of computers, and more particularly to a vehicle track prediction method and device, a storage medium and a terminal device.

BACKGROUND

During traveling of a vehicle, the vehicle may travel in a self-driving mode and a driving decision is made based on lane lines provided by a map.

SUMMARY

A vehicle track prediction method and device are provided according to embodiments of the disclosure, a storage medium and a terminal device, to solve or alleviate one or more abovementioned technical problems in existing technologies.

According to a first aspect, a vehicle track prediction method is provided according to an embodiment of the disclosure, which may include:

determining an obstacle vehicle entering a junction region in a case that an autonomous vehicle enters the junction region;

acquiring historical traveling data of the obstacle vehicle in the junction region;

predicting a potential track of the obstacle vehicle according to the historical traveling data and a current traveling state of the obstacle vehicle; and predicting a track of the autonomous vehicle in the junction region according to the potential track of the obstacle vehicle and a current traveling state of the autonomous vehicle.

In an implementation, the predicting a potential track of the obstacle vehicle according to the historical traveling data and a current traveling state of the obstacle vehicle may include:

determining a selectable exit for the obstacle vehicle in the junction region according to an entrance at which the obstacle vehicle enters the junction region and a current traveling direction of the obstacle vehicle;

if at least two selectable exits are determined, determining probabilities of selectable exits being selected by the obstacle vehicle according to the historical traveling data of the obstacle vehicle in the junction region;

determining an exit by which the obstacle vehicle travels away from the junction region, according to the probabilities of selectable exits selected by the obstacle vehicle; and predicting the potential track of the obstacle vehicle according to the determined exit and the current traveling state of the obstacle vehicle.

In an implementation, the method may further include:

if only one selectable exit is determined, predicting the potential track of the obstacle vehicle according to the one selectable exit and the current traveling state of the obstacle vehicle.

In an implementation, the acquiring historical traveling data of the obstacle vehicle in the junction region may include:

according to an entrance at which the obstacle vehicle enters the junction region, acquiring a lane line coinciding with the entrance in the junction region;

determining whether the obstacle vehicle travels along the lane line, according to the entrance and the current traveling direction of the obstacle vehicle; and if the obstacle vehicle does not travel along the lane line, acquiring the historical traveling data of the obstacle vehicle in the junction region.

In an implementation, if the obstacle vehicle travels along the lane line, no historical traveling data of the obstacle vehicle is acquired, and the potential track of the obstacle vehicle is determined according to the lane line and the current traveling state of the obstacle vehicle.

According to a second aspect, a vehicle track prediction device is provided according to an embodiment of the disclosure, which may include:

an obstacle vehicle determining module configured to determine an obstacle vehicle entering a junction region in a case that an autonomous vehicle enters the junction region;

a traveling data acquiring module configured to acquire historical traveling data of the obstacle vehicle in the junction region;

an obstacle vehicle track predicting module configured to predict a potential track of the obstacle vehicle according to the historical traveling data and a current traveling state of the obstacle vehicle; and an autonomous vehicle track predicting module configured to predict a track of the autonomous vehicle in the junction region according to the potential track of the obstacle vehicle and a current traveling state of the autonomous vehicle.

In an implementation, the obstacle vehicle track predicting module may include:

a first exit determining unit configured to determine a selectable exit for the obstacle vehicle in the junction region according to an entrance at which the obstacle vehicle enters the junction region and a current traveling direction of the obstacle vehicle;

an exit probability determining unit configured to, if at least two selectable exits are determined, determine probabilities of selectable exits being selected by the obstacle vehicle according to the historical traveling data of the obstacle vehicle in the junction region;

a second exit determining unit configured to determine an exit by which the obstacle vehicle travels away from the junction region according to the probabilities of selectable exits selected by the obstacle vehicle; and a first track predicting unit configured to predict the potential track of the obstacle vehicle according to the determined exit and the current traveling state of the obstacle vehicle.

In an implementation, the device may further include:

a second track predicting unit configured to, if only one selectable exit is determined, predict the potential track of the obstacle vehicle according to the one selectable exit and the current traveling state of the obstacle vehicle.

In an implementation, the traveling data acquiring module may include:

a lane acquiring unit configured to, according to an entrance at which the obstacle vehicle enters the junction region, acquire a lane line coinciding with the entrance in the junction region;

a traveling determining unit configured to determine whether the obstacle vehicle travels along the lane line, according to the entrance and the current traveling direction of the obstacle vehicle; and a historical traveling data acquiring unit configured to, if the obstacle vehicle does not travel along the lane line, acquire the historical traveling data of the obstacle vehicle in the junction region.

In an implementation, the obstacle vehicle track predicting module is further configured to: if the obstacle vehicle travels along the lane line, not to acquire historical traveling data of the obstacle vehicle, and determine the potential track of the obstacle vehicle according to the lane line and the current traveling state of the obstacle vehicle.

According to a third aspect, a vehicle track prediction terminal device is provided according to an embodiment of the disclosure. The functions of the server may be implemented by hardware, or by hardware executing corresponding software. The hardware or software includes one or more modules corresponding to the above functions.

In a possible embodiment, a structure of the vehicle track prediction terminal device includes a processor and a storage device, the storage is configured to store a program for supporting the above vehicle track prediction method according to the first aspect, executed by the vehicle track prediction terminal device, and the processor is configured to execute the program stored in the storage device. The vehicle track prediction terminal device further includes a communication interface configured for communication between the terminal device and another apparatus or communication network.

According to a fourth aspect, a computer-readable storage medium is further provided according to an embodiment of the disclosure, for storing computer software instructions which include programs used by the vehicle track prediction terminal device in the second aspect, and involved in execution of the above vehicle track prediction method in the first aspect.

Any one of the technical solutions has the following advantages or beneficial effects.

According to the embodiments of the disclosure, when an autonomous vehicle enters the junction region, according to the historical traveling data of an obstacle vehicle, at least one track of the obstacle vehicle can be predicted, and then a track of the autonomous vehicle is predicted according to the track of the obstacle vehicle and the current traveling state of the autonomous vehicle. Therefore, the track of the obstacle vehicle may be predicted by the autonomous vehicle for making a traveling decision at a junction independently of a lane line, a decision-making accuracy is improved, and a driving risk is reduced.

The above summary is for the purpose of the specification only and is not intended to be limiting in any way. In addition to the illustrative aspects, embodiments, and features described above, further aspects, embodiments, and features of the disclosure will be readily understood by reference to the drawings and the following detailed description.

BRIEF DESCRIPTION OF DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed in accordance with the disclosure and are not to be considered as limiting the scope of the disclosure.

DETAILED DESCRIPTION

In the following, only certain exemplary embodiments are briefly described. As those skilled in the art would realize, the described embodiments may be modified in various different ways, all without departing from the spirit or scope of the disclosure. Accordingly, the drawings and description are to be regarded as illustrative in nature and not restrictive.

In the existing technology, there may be some other vehicles not traveling in the self-driving mode at some junctions, and these vehicles may not travel according to lane lines. Moreover, the lane lines at the junctions may not be completely displayed in the map. In such a case, if the driving decision is still made by the self-driving vehicle according to the lane lines provided by the map, an accident may happen, and a driving risk may be greatly increased.

Figure 1:
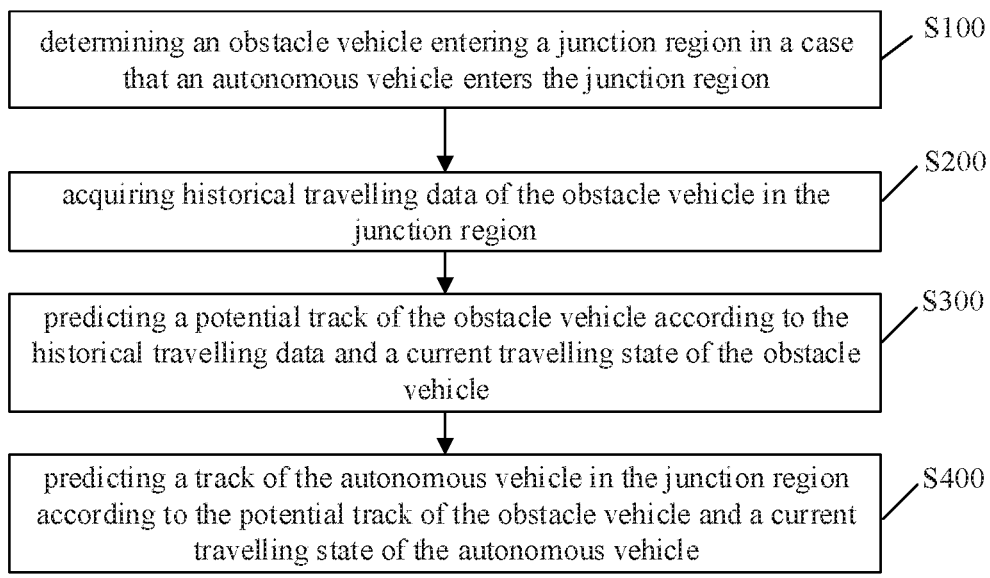
FIG. 1 is a flowchart of an embodiment of a vehicle track prediction method according to the disclosure.

Referring to FIG. 1, a vehicle track prediction method is provided according to an embodiment of the disclosure. The embodiment may be executed on the following motor vehicles: a two-wheeled motor vehicle such as an electric bicycle and a motorcycle, a four-wheeled motor vehicle such as an electric vehicle, a hybrid vehicle or gasoline vehicle, and a traffic equipment such as an airplane and a ship. The method may include steps S100 to S400.

In S100, an obstacle vehicle entering a junction region is determined in a case that an autonomous vehicle enters the junction region.

Figure 2:
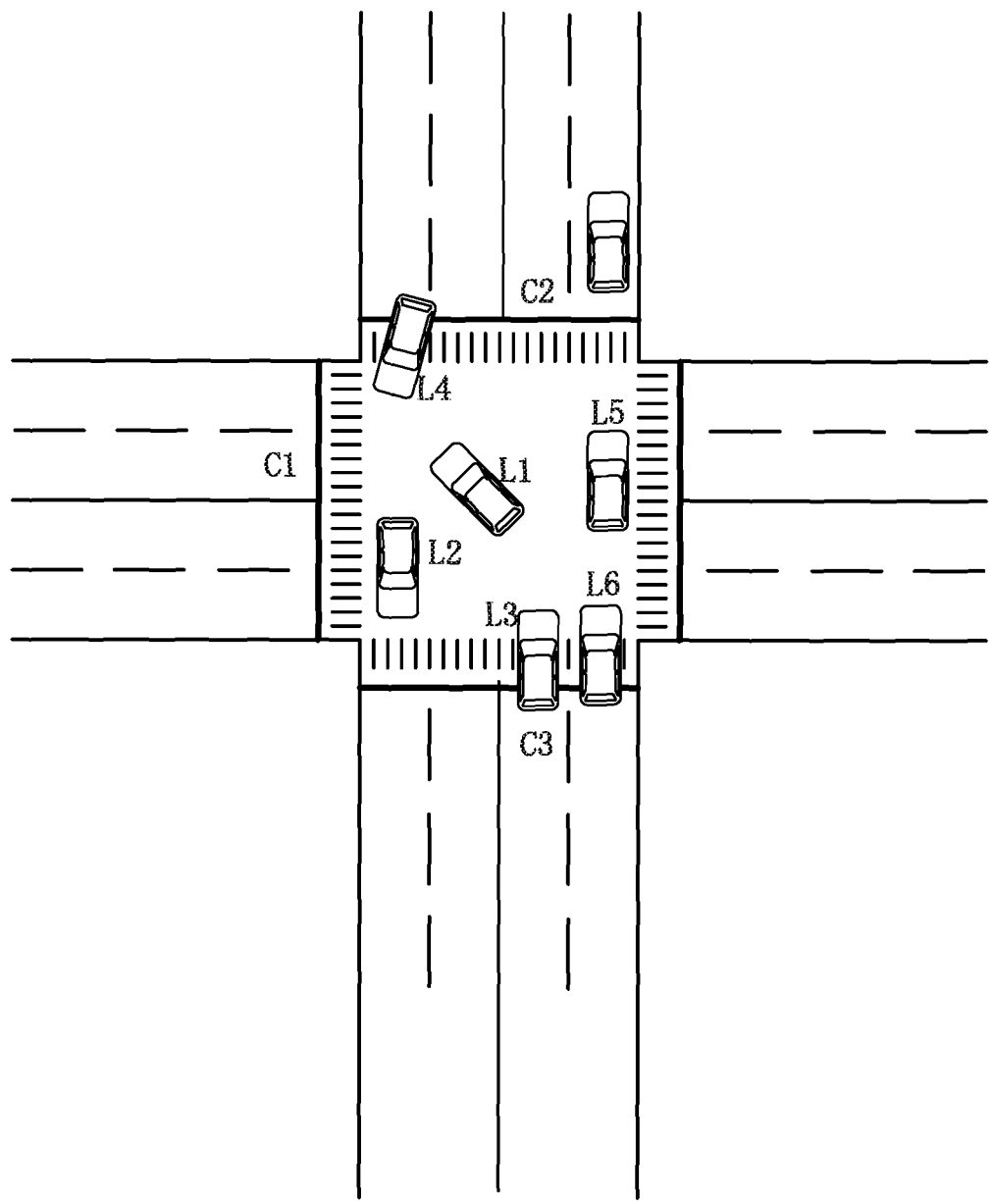
FIG. 2 is a schematic diagram of a traveling environment of a junction region according to the disclosure.

In some embodiments, the junction region may also be called a junction and may include a region enclosed by stop lines of exits/entrances of the junction, as shown in FIG. 2. The junction may include a T-shaped junction, a crossroad, a union jack-shaped junction and the like. For example, as shown in FIG. 2, vehicles entering the junction region include vehicles L1 to L6. If the vehicle L6 is the autonomous vehicle, the vehicles L1 to L5 in the junction region are obstacle vehicles.

In some embodiments, the vehicles other than the autonomous vehicle in the junction region may be screened to determine the obstacle vehicle. Specifically, according to an predicted track of the autonomous vehicle at the junction and a state of each vehicle in the junction region, for example, a distance between the vehicle in the junction region and the autonomous vehicle, a speed and an orientation of the vehicle, it is possible to determine whether the traveling of the autonomous vehicle is affected by the vehicle. If the traveling of the autonomous vehicle is affected by the vehicle, the vehicle is determined as an obstacle vehicle of the autonomous vehicle. As shown in FIG. 2, a current state of the vehicle L2 intended to travel away from the junction region is going straight and a distance with from the autonomous vehicle L6 is relatively long. Then, the vehicle L2 may not be determined as an obstacle vehicle of the autonomous vehicle L6. For another example, the vehicle L5 in the junction region is located on the same lane as the autonomous vehicle L6 and is at a relatively short distance from the autonomous vehicle L6. Then, the vehicle L5 may be determined as an obstacle vehicle of the autonomous vehicle L6. Whether a further vehicle in the junction region is an obstacle vehicle of the autonomous vehicle L6 may also be determined similarly, and will not be repeated herein.

In the embodiment, the autonomous vehicle may be a self-driving vehicle, referring to a vehicle traveling in a self-driving mode.

In S200, historical traveling data of the obstacle vehicle in the junction region is acquired.

In some embodiments, during traveling of a vehicle, traveling data of the vehicle may be uploaded to a data maintenance platform in real time or according to a preset frequency. Alternatively, pre-stored or recorded traveling data may also be uploaded to the data maintenance platform upon receiving a request of the data maintenance platform. During data uploading, the uploaded data may be associatively stored according to an identity of the vehicle for subsequent data search according to the identity of the vehicle. The identity of the vehicle may include a license plate number of the vehicle, registered owner identity information of the vehicle and the like.

In some embodiments, responsive to determining to acquire the historical traveling data of the obstacle vehicle, a camera of the obstacle vehicle may be opened and a picture of the license plate number of the obstacle vehicle is taken by the camera, to obtain the license plate number. The license plate number is determined as an identity of the obstacle vehicle. Furthermore, the historical traveling data may be acquired from the data maintenance platform according to the identity of the obstacle vehicle. The historical traveling data refers to traveling data in a past period, for example, traveling data in the last week, the last month or the last three months.

However, if the traveling data is acquired only according to the identity of the obstacle vehicle, a shortcoming may lie in that the actually acquired data may include data associated with multiple identities. Since a vehicle is usually shared by a family and may be driven by different family members, the actually acquired data includes traveling data for one or more members driving the vehicle if this data is acquired according to the identity of the vehicle. Moreover, in most cases, traveling paths frequently selected by the family members are different. Therefore, after the license plate number is obtained, an image of a driver may further be acquired with a photographic device at the junction configured to monitor a traffic condition of the junction. Then, the acquired image of the driver is identified with a face recognition technology to obtain identity information of the driver. Furthermore, the historical traveling data may be accurately acquired according to the license plate number of the obstacle vehicle and the identity information of the driver, to improve an accuracy of subsequent track prediction.

In S300, a potential track of the obstacle vehicle is predicted according to the historical traveling data and a current traveling state of the obstacle vehicle.

In the embodiment, the traveling state of the vehicle may include information such as a position, a speed and an orientation of the vehicle and an entrance at which the vehicle enters the junction region. The track of a vehicle may include a path of the vehicle in a certain time period, a speed of the vehicle at positions along the path and the like.

In S400, a track of the autonomous vehicle in the junction region is predicted according to the potential track of the obstacle vehicle and a current traveling state of the autonomous vehicle.

In some embodiments, a safety distance between the autonomous vehicle and the obstacle vehicle may be preset. A path of the autonomous vehicle in the junction region may be determined through the potential track of the obstacle vehicle and the preset safety distance. Finally, the track of the autonomous vehicle in the junction region is determined in combination with data such as a current speed of the autonomous vehicle.

According to the embodiment of the disclosure, when an autonomous vehicle enters the junction region, according to the historical traveling data of an obstacle vehicle, the potential track of the obstacle vehicle can be predicted, and then a track of the autonomous vehicle is predicted according to the track of the obstacle vehicle and the current traveling state of the autonomous vehicle. Therefore, the track of the obstacle vehicle may be predicted by the autonomous vehicle for making a traveling decision at a junction independently of a lane line, a decision-making accuracy is improved, and a driving risk is reduced.

Figure 3:
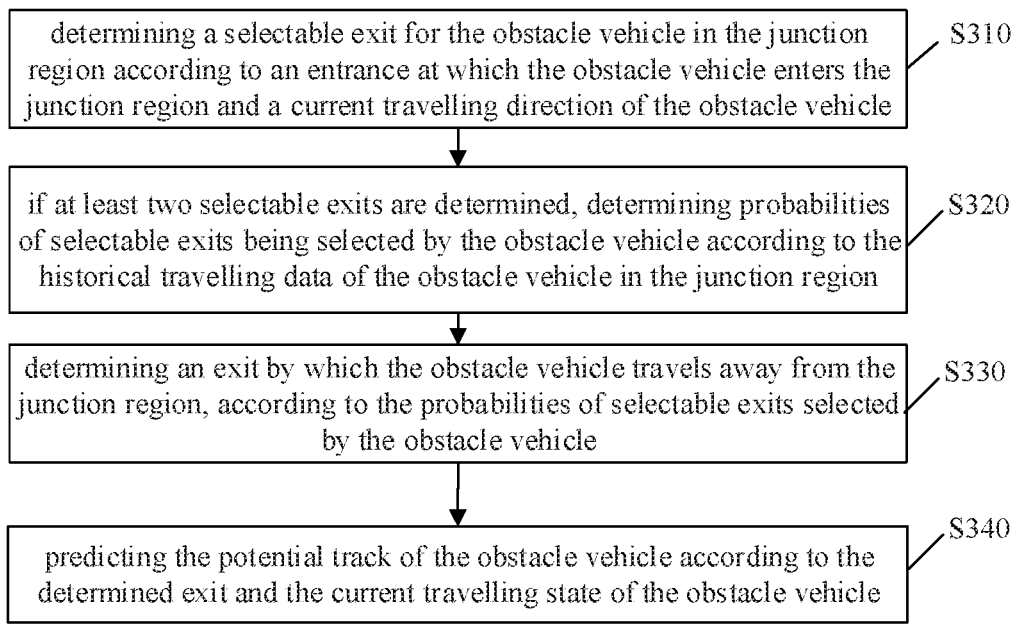
FIG. 3 is a flowchart of an embodiment of a track prediction process for an obstacle vehicle according to the disclosure.

In some embodiments, referring to FIG. 3, S300 may include steps S310 to S340.

In S310, a selectable exit for the obstacle vehicle in the junction region is determined according to an entrance at which the obstacle vehicle enters the junction region and a current traveling direction of the obstacle vehicle. As shown in FIG. 2, an entrance refers to a port at which the vehicle is allowed to enter the junction region. An exit refers to a port by which the vehicle is allowed to drive away from the junction region.

In S320, if at least two selectable exits are determined, probabilities of selectable exits being selected by the obstacle vehicle are determined according to the historical traveling data of the obstacle vehicle in the junction region.

In S330, an exit by which the obstacle vehicle travels away from the junction region is determined according to the probabilities of selectable exits selected by the obstacle vehicle.

In S340, the potential track of the obstacle vehicle is predicted according to the determined exit and the current traveling state of the obstacle vehicle.

Exemplarily, if the vehicle L6 is the autonomous vehicle, a potential track of the obstacle vehicle L3 may be determined through the following determination process. It can be seen from FIG. 2 that a traveling direction of the current obstacle vehicle L3 is going straight, an entrance at which the obstacle vehicle L3 enters the junction region is an entrance C3, a lane on which the entrance C3 is located is a straight or left-turn lane without a lane line identified on the actual road. Therefore, the track of the obstacle vehicle cannot be predicted through a lane line. In such a case, historical traveling data of the obstacle vehicle L3 may be used for prediction.

Exemplarily, a lane on which the obstacle vehicle L3 is located before entering the junction region is a straight or left-turn lane, the current traveling direction of the obstacle vehicle L3 is going straight. However, the obstacle vehicle L3 is relatively far away from the entrance, so that the obstacle vehicle L3 may select an exit for going straight and may also select an exit for turning left. For example, exits C1 and C2 in FIG. 3.

Then, data of the obstacle vehicle L3 relative to the entrance C3 is selected from the acquired historical traveling data, and a number of the obstacle vehicle L3 traveling from the entrance C3 to the exit C1 and a number of the obstacle vehicle L3 traveling from the entrance C3 to the exit C2 is counted. Next, probabilities that the obstacle vehicle selects the exit C1 and the exit C2 are calculated respectively. The probability of selecting the exit C1 is $$\frac{C1}{C1+C2},$$

and the probability of selecting the exit C2 is $$\frac{C2}{C1+C2}.$$

If the calculated probability is higher than a preset probability threshold, the exit with this probability is a selectable exit for the obstacle vehicle. For example, if the preset probability threshold is 95%, the probability of selecting the exit C1 is 98% and the probability of selecting the exit C2 is 2%, the exit C1 is a selectable exit for the obstacle vehicle L3.

If there is no exit with a probability higher than the preset probability threshold, the exit with a higher probability is determined as a selectable exit for the obstacle vehicle. For example, if the preset probability threshold is 95%, the probability of selecting the exit C1 is 56%, the probability of selecting the exit C2 is 40% and a probability of selecting another exit is 4%, the exit C1 may be determined as a selectable exit for the obstacle vehicle.

According to the embodiment, at least one selectable exit for the obstacle vehicle may be determined through the historical traveling data and the entrance for the obstacle vehicle. Then, the track of the obstacle vehicle may be accurately determined according to the selectable exit and the current traveling state of the obstacle vehicle. It is noted that an influence of another vehicle on the track of the obstacle vehicle may also be considered in the track determination process.

In some embodiments, if only one selectable exit is determined in S310, the potential track of the obstacle vehicle is predicted according to the one selectable exit and the current traveling state of the obstacle vehicle.

Figure 4:
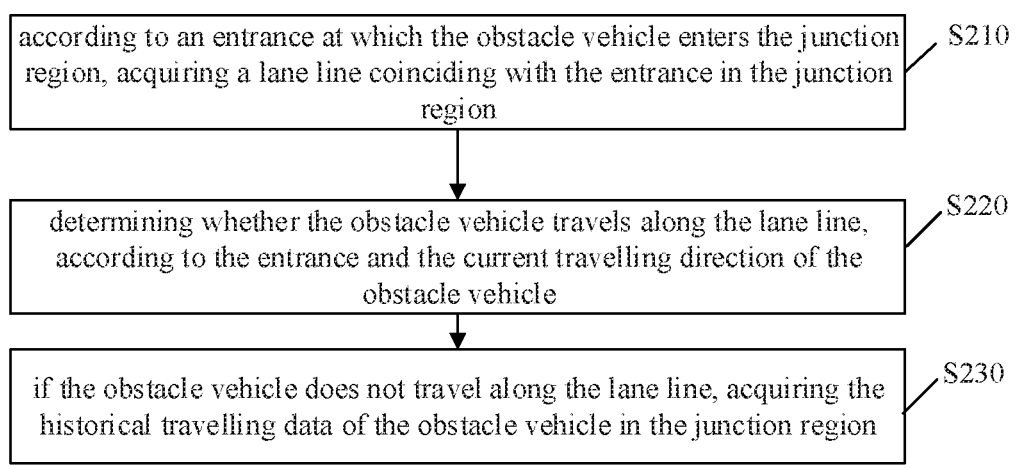
FIG. 4 is a flowchart of an embodiment of a process for acquiring historical traveling data according to the disclosure.

In some embodiments, if the obstacle vehicle entering the junction region may travel along a lane line, the track of the obstacle vehicle may be determined according to the lane line, facilitating to improve a decision-making efficiency. If the obstacle vehicle does not travel along the lane line, the historical traveling data of the obstacle vehicle in the junction region may be acquired to predict the track of the obstacle vehicle in the junction region. Therefore, referring to FIG. 4, S200 may include steps S210 to S230.

In S210, according to an entrance at which the obstacle vehicle enters the junction region, a lane line coinciding with the entrance in the junction region is acquired.

In S220, it is determined whether the obstacle vehicle travels along the lane line, according to the entrance and the current traveling direction of the obstacle vehicle.

In S230, if determining that the obstacle vehicle does not travel along the lane line, the historical traveling data of the obstacle vehicle in the junction region is acquired.

In the embodiment, lane lines in a traffic environment may be acquired by image pickup, and the lane line in a lane or in the junction region of the entrance for the obstacle vehicle is extracted. In some embodiments, not only the lane includes a lane line, but also the junction region may include a lane line.

Referring to FIG. 3, for example, a lane at which the vehicle L3 is located has no lane line displayed on the actual road. In such a case, the lane line for the entrance cannot be acquired by image pickup. Then, the track of the obstacle vehicle may be predicted through the historical traveling data of the obstacle vehicle in the junction region. Specifically, the track of the obstacle vehicle may be predicted by the abovementioned embodiment.

If the lane line at which the obstacle vehicle is located at the entrance is acquired, it is possible to determine whether the obstacle vehicle travels along the lane line according to information such as the current traveling direction and a position of the obstacle vehicle. If there are two or less than two lane lines and the obstacle vehicle travels along one lane line, the track of the obstacle vehicle may be determined according to the lane line of the obstacle vehicle and the current traveling state of the obstacle vehicle. If the obstacle vehicle does not travel along any acquired lane line, the historical traveling data of the obstacle vehicle in the junction region may be acquired, and the track of the obstacle vehicle is predicted according to the historical traveling data of the obstacle vehicle by the abovementioned embodiment.

In some embodiments, if the obstacle vehicle travels along the lane line, it is not required to acquire the historical traveling data, and S300 is not necessarily to be executed anymore. Then, the potential track of the obstacle vehicle is determined according to the lane line and the current traveling state of the obstacle vehicle. Therefore, the track prediction accuracy is improved.

Figure 5:
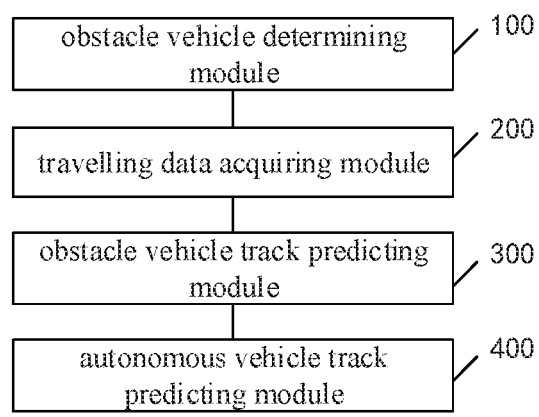
FIG. 5 is a structure diagram of an embodiment of a vehicle track prediction device according to the disclosure.

Referring to FIG. 5, a vehicle track prediction device is further provided according to an embodiment of the disclosure, which includes:

an obstacle vehicle determining module 100 configured to determine an obstacle vehicle entering a junction region in a case that an autonomous vehicle enters the junction region;

a traveling data acquiring module 200 configured to acquire historical traveling data of the obstacle vehicle in the junction region;

an obstacle vehicle track predicting module 300 configured to predict a potential track of the obstacle vehicle according to the historical traveling data and a current traveling state of the obstacle vehicle; and an autonomous vehicle track predicting module 400 configured to predict a track of the autonomous vehicle in the junction region according to the potential track of the obstacle vehicle and a current traveling state of the autonomous vehicle.

In an implementation, the obstacle vehicle track predicting module 300 includes:

a first exit determining unit configured to determine a selectable exit for the obstacle vehicle in the junction region according to an entrance at which the obstacle vehicle enters the junction region and a current traveling direction of the obstacle vehicle;

an exit probability determining unit configured to, if at least two selectable exits are determined, determine probabilities of selectable exits being selected by the obstacle vehicle according to the historical traveling data of the obstacle vehicle in the junction region;

a second exit determining unit configured to determine an exit by which the obstacle vehicle travels away from the junction region according to the probabilities of selectable exits selected by the obstacle vehicle; and a first track predicting unit configured to predict the potential track of the obstacle vehicle according to the determined exit and the current traveling state of the obstacle vehicle.

In an implementation, the device further includes:

a second track predicting unit configured to, if only one selectable exit is determined, predict the potential track of the obstacle vehicle according to the one selectable exit and the current traveling state of the obstacle vehicle.

In an implementation, the traveling data acquiring module includes:

a lane acquiring unit configured to, according to an entrance at which the obstacle vehicle enters the junction region, acquire a lane line coinciding with the entrance in the junction region;

a traveling determining unit configured to determine whether the obstacle vehicle travels along the lane line, according to the entrance and the current traveling direction of the obstacle vehicle; and a historical traveling data acquiring unit configured to, if the obstacle vehicle does not travel along the lane line, acquire the historical traveling data of the obstacle vehicle in the junction region.

In an implementation, the obstacle vehicle track predicting module is further configured to: if the obstacle vehicle travels along the lane line, not to acquire historical traveling data of the obstacle vehicle, and determine the potential track of the obstacle vehicle according to the lane line and the current traveling state of the obstacle vehicle.

The functions of the device may be implemented by hardware, or may be implemented by hardware executing corresponding software. The hardware or software includes one or more modules corresponding to the functions described above.

In a possible embodiment, a structure of the vehicle track prediction device includes a processor and a memory configured to execute a program of the vehicle track prediction method in the first aspect of the above-described vehicle track prediction device, the processor configured to execute the program stored in the memory. The vehicle track prediction device may further include a communication interface for communication between the vehicle track prediction device and other apparatus or communication networks.

Figure 6:
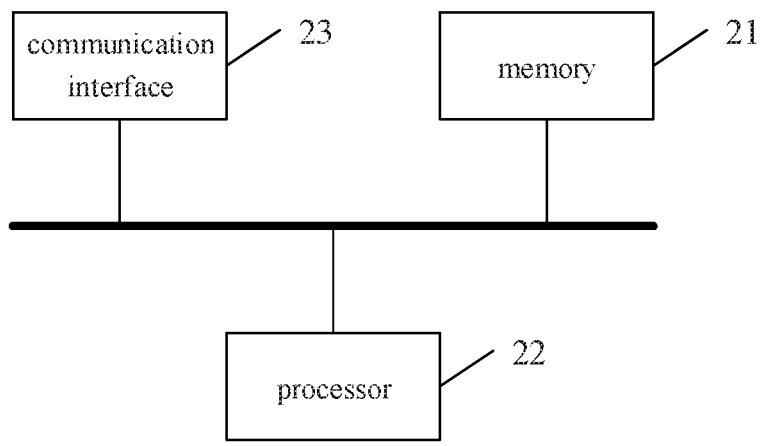
FIG. 6 is a structure diagram of an embodiment of a terminal device according to the disclosure.

A vehicle track prediction terminal device is further provided according to an embodiment of the disclosure. As shown in FIG. 6, the terminal device includes a memory 21 and a processor 22. The memory 21 stores a computer program executable on the processor 22. When the processor 22 executes the computer program, the method for processing an audio signal in a vehicle in the foregoing embodiment is implemented. The number of the memory 21 and the processor 22 may be one or more.

The terminal device further includes a communication interface 23 configured to communicate with an external device and exchange data.

The memory 21 may include a high-speed RAM memory and may also include a non-volatile memory, such as at least one magnetic disk memory.

If the memory 21, the processor 22, and the communication interface 23 are implemented independently, the memory 21, the processor 22, and the communication interface 23 may be connected to each other through a bus and communicate with one another. The bus may be an industry Standard Architecture (ISA) bus, a Peripheral Component (PCI) bus, an Extended Industry Standard Component (EISA) bus, or the like. The bus may be divided into an address bus, a data bus, a control bus, and the like. For ease of illustration, only one bold line is shown in FIG. 6, but it does not mean that there is only one bus or one type of bus.

Optionally, in a specific implementation, if the memory 21, the processor 22, and the communication interface 23 are integrated on one chip, the memory 21, the processor 22, and the communication interface 23 may implement mutual communication through an internal interface.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the disclosure. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the disclosure, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the disclosure includes additional implementations where the functions may not be performed in the order shown or discussed, including according to the functions involved, in substantially simultaneous or in reverse order, which should be understood by those skilled in the art to which the embodiment of the disclosure belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus.

More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM), in addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood that various portions of the disclosure may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the disclosure may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the disclosure, but not intended to limit the protection scope of the disclosure. Those skilled in the art may easily conceive of various changes or modifications within the technical scope disclosed herein, all these should be covered within the protection scope of the disclosure. Therefore, the protection scope of the disclosure should be subject to the protection scope of the claims.

The invention claimed is:

1. A vehicle track prediction method, comprising:
determining an obstacle vehicle entering a junction region in a case that an autonomous vehicle enters the junction region, wherein the junction region is a region enclosed by exits and entrances of an intersection;
acquiring historical travelling data of the obstacle vehicle in the junction region;
predicting a potential track of the obstacle vehicle in the junction region according to the historical travelling data of the obstacle vehicle in the junction region and a current travelling state of the obstacle vehicle; and
predicting a track of the autonomous vehicle in the junction region according to the potential track of the obstacle vehicle in the junction region and a current travelling state of the autonomous vehicle.

2. The vehicle track prediction method of claim 1, wherein the predicting the potential track of the obstacle vehicle in the junction region according to the historical travelling data of the obstacle vehicle in the junction region and the current travelling state of the obstacle vehicle comprises:
determining a selectable exit for the obstacle vehicle in the junction region according to an entrance at which the obstacle vehicle enters the junction region and a current travelling direction of the obstacle vehicle;
if at least two selectable exits are determined, determining probabilities of selectable exits being selected by the obstacle vehicle according to the historical travelling data of the obstacle vehicle in the junction region;
determining an exit by which the obstacle vehicle travels away from the junction region, according to the probabilities of selectable exits selected by the obstacle vehicle; and
predicting the potential track of the obstacle vehicle according to the determined exit and the current travelling state of the obstacle vehicle.

3. The vehicle track prediction method of claim 2, further comprising:
if only one selectable exit is determined, predicting the potential track of the obstacle vehicle according to the one selectable exit and the current travelling state of the obstacle vehicle.

4. The vehicle track prediction method of claim 1, wherein the acquiring historical travelling data of the obstacle vehicle in the junction region comprises:
according to an entrance at which the obstacle vehicle enters the junction region, acquiring a lane line coinciding with the entrance in the junction region;
determining whether the obstacle vehicle travels along the lane line, according to the entrance and a current travelling direction of the obstacle vehicle; and
if the obstacle vehicle does not travel along the lane line, acquiring the historical travelling data of the obstacle vehicle in the junction region.

5. The vehicle track prediction method of claim 4, wherein if the obstacle vehicle travels along the lane line, the potential track of the obstacle vehicle is determined according to the lane line and the current travelling state of the obstacle vehicle.

6. A vehicle track prediction device, comprising:
one or more processors; and
a storage device configured for storing one or more programs, wherein
the one or more programs are executed by the one or more processors to enable the one or more processors to:
determine an obstacle vehicle entering a junction region in a case that an autonomous vehicle enters the junction region, wherein the junction region is a region enclosed by exits and entrances of an intersection;
acquire historical travelling data of the obstacle vehicle in the junction region;
predict a potential track of the obstacle vehicle in the junction region according to the historical travelling data of the obstacle vehicle in the junction region and a current travelling state of the obstacle vehicle; and
predict a track of the autonomous vehicle in the junction region according to the potential track of the obstacle vehicle in the junction region and a current travelling state of the autonomous vehicle.

7. The vehicle track prediction device of claim 6, wherein the one or more programs are executed by the one or more processors to enable the one or more processors further to:
determine a selectable exit for the obstacle vehicle in the junction region according to an entrance at which the obstacle vehicle enters the junction region and a current travelling direction of the obstacle vehicle;

if at least two selectable exits are determined, determine probabilities of selectable exits being selected by the obstacle vehicle according to the historical travelling data of the obstacle vehicle in the junction region;

determine an exit by which the obstacle vehicle travels away from the junction region according to the probabilities of selectable exits selected by the obstacle vehicle; and predict the potential track of the obstacle vehicle according to the determined exit and the current travelling state of the obstacle vehicle.

8. The vehicle track prediction device of claim 7, wherein the one or more programs are executed by the one or more processors to enable the one or more processors further to:

if only one selectable exit is determined, predict the potential track of the obstacle vehicle according to the one selectable exit and the current travelling state of the obstacle vehicle.

9. The vehicle track prediction device of claim 6, wherein the one or more programs are executed by the one or more processors to enable the one or more processors further to:

according to an entrance at which the obstacle vehicle enters the junction region, acquire a lane line coinciding with the entrance in the junction region;

determine whether the obstacle vehicle travels along the lane line, according to the entrance and a current travelling direction of the obstacle vehicle; and if the obstacle vehicle does not travel along the lane line, acquire the historical travelling data of the obstacle vehicle in the junction region.

10. The vehicle track prediction device of claim 9, wherein the one or more programs are executed by the one or more processors to enable the one or more processors further to: if the obstacle vehicle travels along the lane line, determine the potential track of the obstacle vehicle according to the lane line and the current travelling state of the obstacle vehicle.

11. A non-transitory computer-readable storage medium, storing computer executable instructions stored thereon, that when executed by a processor cause the processor to perform operations comprising:

determining an obstacle vehicle entering a junction region in a case that an autonomous vehicle enters the junction region, wherein the junction region is a region enclosed by exits and entrances of an intersection;

acquiring historical travelling data of the obstacle vehicle in the junction region;

predicting a potential track of the obstacle vehicle in the junction region according to the historical travelling data of the obstacle vehicle in the junction region and a current travelling state of the obstacle vehicle; and predicting a track of the autonomous vehicle in the junction region according to the potential track of the obstacle vehicle in the junction region and a current travelling state of the autonomous vehicle.

12. The non-transitory computer-readable storage medium of claim 11, wherein the computer executable instructions, when executed by a processor, cause the processor to perform further operations comprising:

determining a selectable exit for the obstacle vehicle in the junction region according to an entrance at which the obstacle vehicle enters the junction region and a current travelling direction of the obstacle vehicle;

if at least two selectable exits are determined, determining probabilities of selectable exits being selected by the obstacle vehicle according to the historical travelling data of the obstacle vehicle in the junction region;

determining an exit by which the obstacle vehicle travels away from the junction region, according to the probabilities of selectable exits selected by the obstacle vehicle; and predicting the potential track of the obstacle vehicle according to the determined exit and the current travelling state of the obstacle vehicle.

13. The non-transitory computer-readable storage medium of claim 12, wherein the computer executable instructions, when executed by a processor, cause the processor to perform further operations comprising:

if only one selectable exit is determined, predicting the potential track of the obstacle vehicle according to the one selectable exit and the current travelling state of the obstacle vehicle.

14. The non-transitory computer-readable storage medium of claim 11, wherein the computer executable instructions, when executed by a processor, cause the processor to perform further operations comprising:

according to an entrance at which the obstacle vehicle enters the junction region, acquiring a lane line coinciding with the entrance in the junction region;

determining whether the obstacle vehicle travels along the lane line, according to the entrance and a current travelling direction of the obstacle vehicle; and if the obstacle vehicle does not travel along the lane line, acquiring the historical travelling data of the obstacle vehicle in the junction region.

15. The non-transitory computer-readable storage medium of claim 14, wherein if the obstacle vehicle travels along the lane line, the potential track of the obstacle vehicle is determined according to the lane line and the current travelling state of the obstacle vehicle.

* * * * *